G. L. SIMPSON.
NONSKID SECTIONAL TIRE TREAD.
APPLICATION FILED MAY 11, 1921.

1,403,452.

Patented Jan. 10, 1922.

GEORGE L. SIMPSON
INVENTOR.

BY *Hazard & Miller*
ATTORNEYS.

UNITED STATES PATENT OFFICE.

GEORGE L. SIMPSON, OF SANTA ANA, CALIFORNIA.

NONSKID SECTIONAL TIRE TREAD.

1,403,452.  Specification of Letters Patent.  Patented Jan. 10, 1922.

Application filed May 11, 1921. Serial No. 468,507.

*To all whom it may concern:*

Be it known that I, GEORGE L. SIMPSON, a citizen of the United States, residing at Santa Ana, in the county of Orange and State of California, have invented new and useful Improvements in Nonskid Sectional Tire Treads, of which the following is a specification.

This invention relates to antiskid treads for pneumatic tires which include a plurality of tread members preferably formed from old tire casings and received around the tread of the tire with locking means connecting the respective antiskid tread sections.

The present invention provides improved means for securing together the tread sections so as to provide an efficient construction, but one which is simple and inexpensive to manufacture.

The invention will be readily understood from the following description of the accompanying drawings, in which.

Figure 1:
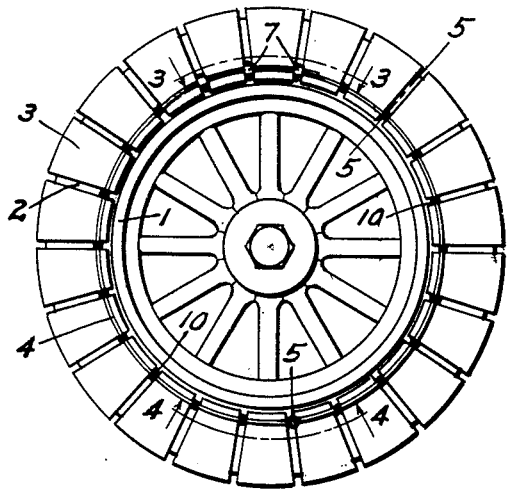
Figure 1 is a side elevation of a tire showing the improved antiskid sectional tread applied thereto.
Figure 2:
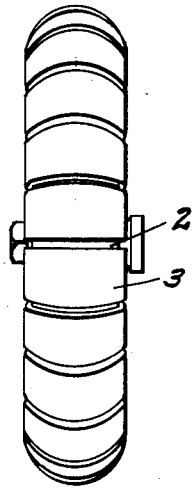
Fig. 2 is an edge view of the same.
Figure 3:
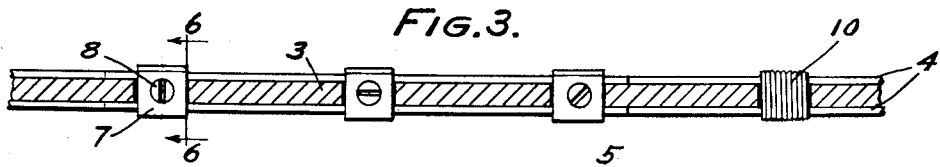
Figure 4:
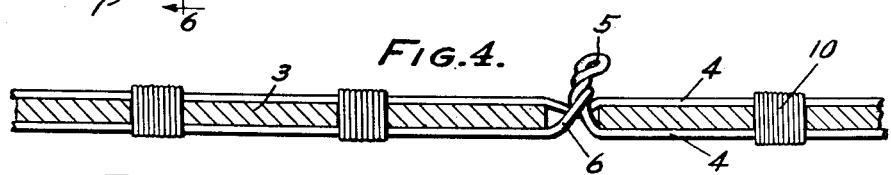

Figs. 3 and 4 are detail sections on the lines 3—3 and 4—4 of Fig. 1.

Figure 5:
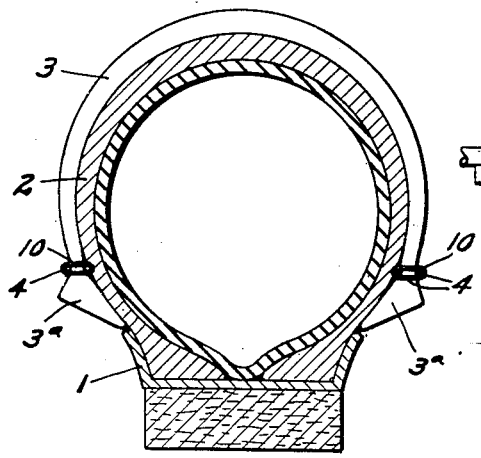

Fig. 5 is a transverse section on the line 5—5 of Fig. 1.

Figures 6, 7:
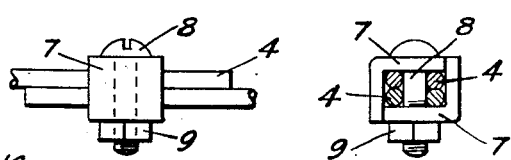

Fig. 6 is a detail section through one of the clamping members and taken on the line 6—6 of Fig. 3.

Fig. 7 is a side elevation of this clamping member.

The improved tread structure is employed in connection with a usual pneumatic tire mounted upon the rim 1 and including a tire casing 2. A plurality of sections form the tread received over the tread of casing 2, and said sections may be sections of a worn out tire casing, as shown at 3. These sections are received over the tread of tire casing and are provided with improved detachable connecting means for connecting the same in position.

The connecting means includes two wires each formed as a loop with the respective strands of said loops as shown at 4, received against opposite surfaces of the tread sections 3 and extending around the plurality of tread sections just above the beads 3ª at the ends of said tread sections. Each of the wires thus connect approximately one-half of the tread sections received around a tire, and the medial portions of said looped wires are positioned adjacent one another between adjacent tread sections 3 and are twisted to form a co-operating hook and eye 5 and 6 adapted to be received one within the other so as to detachably connect the wires.

The ends of the looped wires which extend around the tire overlap and are provided with clamping means engaging said wires so as to connect the strands of the respective wires and also connect one wire to another. These clamping means are preferably arranged between several of adjacent tread sections and are shown as co-operating angle clips 7 arranged to engage the strands of both wires between the same with a usual bolt 8 and nut 9 functioning to connect the angle clips and clamp the same upon the wires.

The two strands of each looped wire are preferably also connected between each of adjacent tread sections as by wrapping a wire 10 around said strands and in the spaces between tread sections.

The construction, as thus described, provides means for connecting the fastening wires firmly to the tread sections, and for also detachably connecting the respective looped wires in order that the tread for the tire which is thus formed may be readily removed or replaced in position.

Various changes may be made without departing from the spirit of the invention as claimed.

What is claimed is:

1. The combination with a tire of a tread comprising tread sections, and connecting means for said tread sections, including looped wires each received around a portion of the tire and alongside of the respective surfaces of a part of said tread sections and adjacent the ends of the same, fastening wires coiled about said wire loops between said tread sections, the ends of said looped wires overlapping, and clamping means engaging the strands of said looped wires at said overlapped ends and between adjacent tread sections for spacing the latter.

2. The combination with a tire of a tread comprising tread sections, and connecting means for said tread sections, including looped wires each received around a portion of the tire and alongside of the respective surfaces of a part of said tread sections and adjacent the ends of the same, said loops forming detachable connecting means between said tread sections, wires coiled about said wire loops between said tread sections to secure said looped wires to each other and to serve as spacing means between the tread sections, the ends of said looped wires overlapping, and clamping means engaging the strands of said looped wires at said overlapped ends.

3. The combination with a tire of a tread comprising tread sections, and connecting means for said tread sections, including looped wires each received around a portion of the tire and alongside of the respective surfaces of a part of said tread sections and adjacent the ends of the same, said loops forming detachable connecting means between the same, the ends of said looped wires overlapping, clamping means engaging the strands of said looped wires at said overlapped ends and between adjacent tread sections for spacing the latter, and coils of wire for connecting the strands of each loop between adjacent tread sections so as to space said tread sections.

In testimony whereof I have signed my name to this specification.

GEORGE L. SIMPSON.